United States Patent
Liao et al.

(10) Patent No.: US 11,282,164 B2
(45) Date of Patent: Mar. 22, 2022

(54) DEPTH-GUIDED VIDEO INPAINTING FOR AUTONOMOUS DRIVING

(71) Applicants: Baidu USA LLC, Sunnyvale, CA (US); Baidu.com Times Technology (Beijing) Co., Ltd., Beijing (CN)

(72) Inventors: Miao Liao, Sunnyvale, CA (US); Feixiang Lu, Beijing (CN); Dingfu Zhou, Beijing (CN); Sibo Zhang, Sunnyvale, CA (US); Ruigang Yang, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/770,904

(22) PCT Filed: May 26, 2020

(86) PCT No.: PCT/CN2020/092390
§ 371 (c)(1),
(2) Date: Jun. 8, 2020

(65) Prior Publication Data
US 2021/0374904 A1 Dec. 2, 2021

(51) Int. Cl.
*G06T 3/00* (2006.01)
*G06T 7/73* (2017.01)
(Continued)

(52) U.S. Cl.
CPC .......... *G06T 3/0093* (2013.01); *G06T 3/4038* (2013.01); *G06T 7/521* (2017.01);
(Continued)

(58) Field of Classification Search
CPC ....... G06T 3/0093; G06T 3/4038; G06T 7/73; G06T 7/55; G06T 11/40; G06T 7/521; G06T 2207/10028
See application file for complete search history.

(56) References Cited

U.S. PATENT DOCUMENTS

2014/0376807 A1* 12/2014 Shechtman .......... G06K 9/4652
382/165
2016/0110613 A1 4/2016 Ghanem et al.
(Continued)

FOREIGN PATENT DOCUMENTS

| CN | 103561258 A | 2/2014 |
| CN | 104780355 A | 7/2015 |
| CN | 110322542 A | 10/2019 |

*Primary Examiner* — Chan S Park
*Assistant Examiner* — Daniel C Chang
(74) *Attorney, Agent, or Firm* — Womble Bond Dickinson (US) LLP

(57) ABSTRACT

Systems and methods of video inpainting for autonomous driving are disclosed. For example, the method stitches a multiplicity of depth frames into a 3D map, where one or more objects in the depth frames have previously been removed. The method further projects the 3D map onto a first image frame to generate a corresponding depth map, where the first image frame includes a target inpainting region. For each target pixel within the target inpainting region of the first image frame, based on the corresponding depth map, the method further maps the target pixel within the target inpainting region of the first image frame to a candidate pixel in a second image frame. The method further determines a candidate color to fill the target pixel. The method further performs Poisson image editing on the first image frame to achieve color consistency at a boundary and between inside and outside of the target inpainting region of the first image frame. For each pixel in the target inpainting region of the first image frame, the method further traces the
(Continued)

pixel into neighboring frames and replacing an original color of the pixel with an average of colors sampled from the neighboring frames.

15 Claims, 11 Drawing Sheets

(51) Int. Cl.
    *G06T 11/40*     (2006.01)
    *G06T 7/55*     (2017.01)
    *G06T 7/521*     (2017.01)
    *G06T 3/40*     (2006.01)

(52) U.S. Cl.
    CPC .................. *G06T 7/55* (2017.01); *G06T 7/73* (2017.01); *G06T 11/40* (2013.01); *G06T 2207/10028* (2013.01)

(56) References Cited

U.S. PATENT DOCUMENTS

| | | |
|---|---|---|
| 2017/0061701 A1 | 3/2017 | Mittal et al. |
| 2019/0096125 A1* | 3/2019 | Schulter ............... G05D 1/0088 |
| 2020/0193623 A1* | 6/2020 | Liu ........................... G06T 7/50 |

* cited by examiner

DEPTH-GUIDED VIDEO INPAINTING FOR AUTONOMOUS DRIVING

CROSS-REFERENCE TO RELATED APPLICATIONS

This application is a U.S. National Phase application under 37 U.S.C. § 371 of International Application No. PCT/CN2020/092390, filed May 26, 2020, entitled "DEPTH-GUIDED VIDEO INPAINTING FOR AUTONOMOUS DRIVING", the disclosure of which is incorporated herein by reference.

TECHNICAL FIELD

Embodiments of the present disclosure relate generally to autonomous driving. More particularly, embodiments of the disclosure relate to systems and methods for depth-guided video inpainting for autonomous driving.

BACKGROUND

As computational power increases, multi-modality sensing has become more and more popular in recent years. In particular, in the area of autonomous driving (AD), multiple sensors are combined to overcome the drawbacks of individual ones, which can provide redundancy for safety. Nowadays, most self-driving vehicles are equipped with light detection and range (LIDAR) and cameras for both perception and mapping. Moreover, simulation systems have become essential to the development and validation of AD technologies. Instead of using computer graphics to create virtual driving scenarios, augmented real-world pictures with simulated traffic flow have been previously proposed to create photorealistic simulation images and renderings. One key component in the pipeline of such photorealistic simulation images and renderings is to remove moving agents on the road to generate clean background street images. Those kinds of data can be generated using an augmented platform and a video inpainting method based on the deep learning techniques.

Map service companies, which display street-level panoramic views in their map applications (Apps), also choose to place depth sensors in addition to image sensors on their capture vehicles. Due to privacy protection, however, those street view images have to be post-processed to blur human faces and vehicle license plates before posted for public access. As such, is a strong desire to completely remove those agents on the road for better privacy protection and more clear street images.

Significant progress has been made in image inpainting in recent years. The mainstream approaches adopt a patch-based method to complete missing regions by sampling and pasting similar patches from known regions or other source images. The method has been naturally extended to video inpainting, where not only spatial coherence but also temporal coherence is preserved.

The basic idea behind video inpainting is that missing regions/pixels within a frame are observed in some other frames of the same video. Under this observation, some prior art methods use optical flow as guidance to fill the missing pixels either explicitly or implicitly. They are successfully applied in different scenarios with seamless inpainting results. However, flow computation suffers from textureless areas, regardless if it is learning based or not. Furthermore, perspective changes in the video can also degrade the quality of optical flow estimation. These framewise flow errors are accumulated when missing pixels are filled from a temporally distant frame, thereby resulting in distorted inpainting results.

The emergence of deep learning, particularly generative adversarial networks (GAN), has provided a powerful tool for inpainting. For images, some conventional methods have formulated inpainting as a conditional image generation problem. Although formulated differently, GAN-based inpainting approaches are essentially identical as the patch-based approach, since the spirit is still looking for similar textures in the training data and fill the holes. Therefore, those conventional methods have to delicately choose their training data to match the domain of the input images, though domain adaptation is not an easy task once the input images come from different scenarios. Moreover, GAN-based approaches share the same problem as the patch-based methods that they are poor at handling perspective changes in images.

With respect to inpainting, the principle of inpainting is filling the target holes by borrowing appearance information from known sources. The sources could be regions other than the hole in the same image, images from the same video or images/videos of similar scenarios. It is critical to reduce the search space for the right pixels. Following different cues, prior works can be categorized into 3 major classes: propagation-based inpainting, patch-based inpainting, and learning-based inpainting.

Propagation-based methods extrapolate boundary pixels around the holes for image completion. These approaches are successfully applied to regions of uniform colors. However, it has difficulties to fill large holes with rich texture variations. Thus, propagation-based approaches usually repair small holes and scratches in an image.

Patch-based methods, on the other hand, not only look at the boundary pixels but also search in the other regions/images for similar appearance in order to complete missing regions. This kind of approach has been extended to the temporal domain for video inpainting. For example, optical flow and color in the missing regions are jointly estimated to address the temporal consistency problem. In general, patch-based methods can better handle non-stationary visual data. As suggested by its name, patch-based methods depend on reliable pixel matches to copy and paste image patches to missing regions. When a pixel match cannot be robustly obtained, for example in cases of big perspective changes or illumination changes, the inpainting results are problematic.

Regarding learning-based inpainting, the success of deep learning techniques inspires recent works on applying it for image inpainting. For example, one prior art method adds a few feature maps in the new Shepard layers to achieve stronger results than a much deeper network architecture. GAN was first introduced to generate novel photos. It is straightforward to extend it to inpainting by formulating inpainting as a conditional image generation problem. Another prior art method proposed context encoders—a convolutional neural network trained to generate contents of an arbitrary image region conditioned on its surroundings. The context encoders are trained to both understand the content of the entire image, as well as produce a plausible hypothesis for the missing parts. Still another prior art method used global and local context discriminators to distinguish real images from fake ones. The global discriminator looks at the entire image to ensure it is coherent as a whole, while the local discriminator looks only at a small area centered at the completed region to ensure the local consistency of the generated patches. More recently, a contextual attention mechanism in a generative inpainting framework was presented, which further improves the inpainting quality. For video inpainting, an effective framework that is specially designed to exploit redundant information across video frames was formulated. They first synthesize a spatially and temporally coherent optical flow field across video frames, then the synthesized flow field is used to guide the propagation of pixels to fill up the missing regions in the video.

SUMMARY

Embodiments of the present disclosure provide a computer-implemented method of video inpainting, a non-transitory machine-readable medium, and a data processing system.

In a first aspect, some embodiments of the present disclosure provide a computer-implemented method of video inpainting, the method includes: receiving a plurality of sensor data sets comprising depth frames and image frames; for each depth frame, removing one or more objects from the depth frame thereby producing a plurality of resulting depth frames without the one or more objects; stitching the plurality of resulting depth frames into a three-dimensional (3D) map; refining a camera pose of a first image frame having a target inpainting region; and projecting the 3D map onto the first image frame to generate a corresponding depth map.

In a second aspect, some embodiments of the present disclosure provide a non-transitory machine-readable medium having instructions stored therein, which when executed by a processor, cause the processor to perform operations, the operations include: receiving a plurality of sensor data sets comprising depth frames and image frames; for each depth frame, removing one or more objects from the depth frame thereby producing a plurality of resulting depth frames without the one or more objects; stitching the plurality of resulting depth frames into a three-dimensional (3D) map; refining a camera pose of a first image frame having a target inpainting region; and projecting the 3D map onto the first image frame to generate a corresponding depth map.

In a third aspect, some embodiments of the present disclosure provide a data processing system, the method includes: a processor; and a memory coupled to the processor to store instructions, which when executed by the processor, cause the processor to perform operations, the operations including: receiving a plurality of sensor data sets comprising depth frames and image frames; for each depth frame, removing one or more objects from the depth frame thereby producing a plurality of resulting depth frames without the one or more objects; stitching the plurality of resulting depth frames into a three-dimensional (3D) map; refining a camera pose of a first image frame having a target inpainting region; projecting the 3D map onto the first image frame to generate a corresponding depth map; and for each target pixel within the target inpainting region of the first image frame, based on the corresponding depth map, mapping the target pixel within the target inpainting region of the first image frame to a candidate pixel in a second image frame included in the image frames, and determining a candidate color to fill the target pixel.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
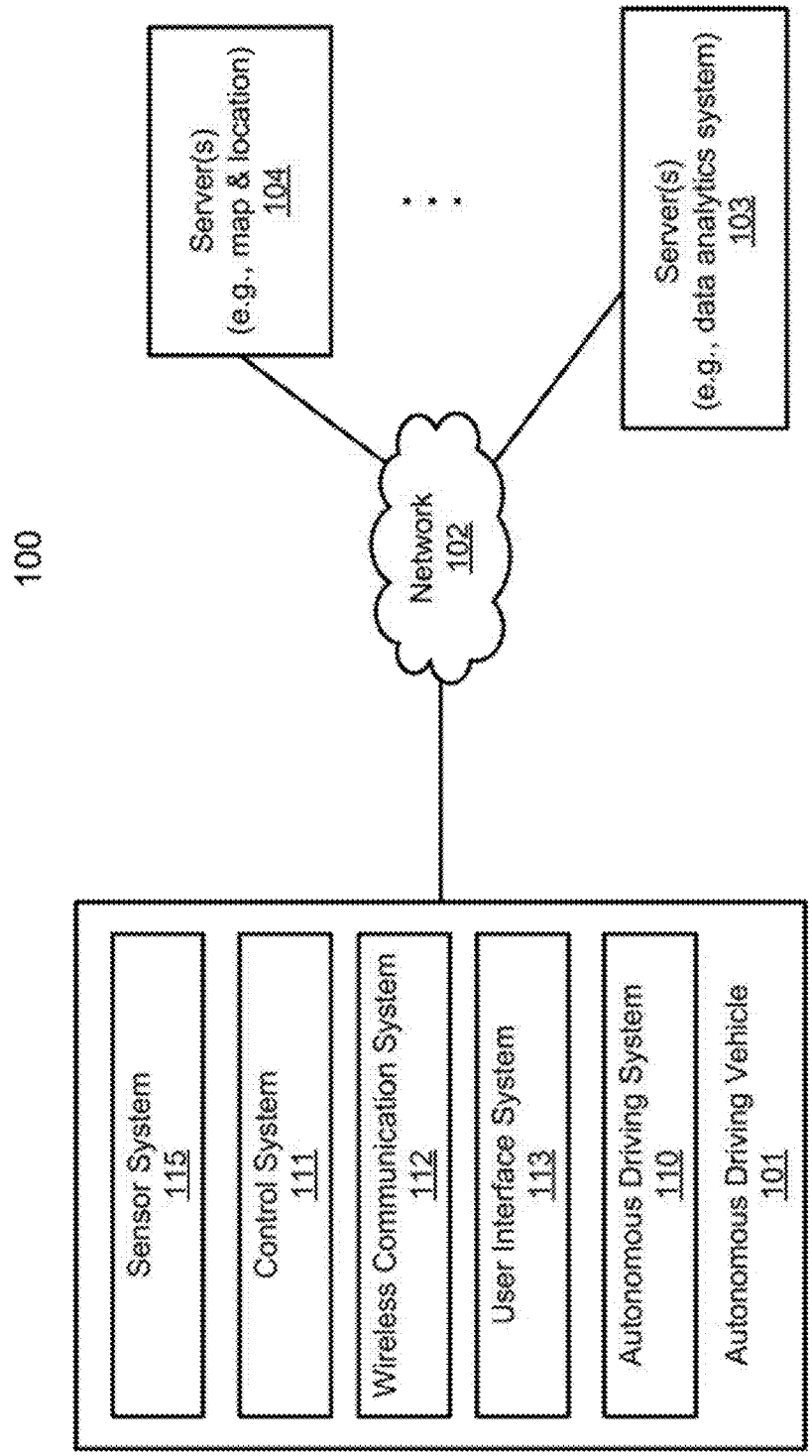
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, to get clear street view and photo realistic simulation in autonomous driving, described herein is an automatic video inpainting algorithm that can remove traffic agents from videos and synthesize missing regions with the guidance of depth/point cloud. By building a dense 3D map from stitched point clouds, frames within a video are geometrically correlated via this common 3D map. In order to fill a target inpainting area in a frame, pixels from other frames can be transformed into the current one with correct occlusion. Furthermore, multiple videos can be fused through 3D point cloud registration, thereby making it possible to inpaint a target video with multiple source videos. The motivation of the embodiments of the disclosure described herein is to solve the long-time occlusion problem where an occluded area has never been visible in the entire video. Therefore, the embodiments of the disclosure are novel and are the first to enable fusing of multiple videos for video inpainting in order to solve such long time occlusion problem.

According to some embodiments, video inpainting method and system with the guidance of three-dimensional (3D) maps in AD scenarios are described herein. In one embodiment, the use of deep learning-based methods can be avoided so that the entire pipeline may only run on central processing units (CPUs). This makes it easy to be generalized to different platforms and different use cases because it does not require graphics processing units (GPUs) and domain adaptation of training data. In some embodiments, 3D map guided inpainting is a new direction for the inpainting community to explore, given that more and more videos are accompanied with depth data.

According to some embodiments, described herein is a method to inpaint street-view videos with the guidance of depth, as image+depth sensors become standard for AD vehicles. For example, depending on the tasks, target objects are either manually labeled or automatically detected in color images, and then removed from their depth counterpart. A 3D map may be built by stitching all point clouds together and projected back onto individual frames. Most of the frame pixels are assigned with a depth value via 3D projection and those remaining pixels obtain their depth by interpolation. With a dense depth map and known extrinsic camera parameters, colors can be sampled from other frames to fill holes within the current frame. These colors serve as an initial guess for those missing pixels, followed by regularization enforcing spatial and photometric smoothness. After that, color harmonization can be applied to generate smooth and seamless blending boundaries. In the end, a moving average is applied along the optical flow to make the final inpainted video look smooth temporally.

Unlike learning-based methods, the approach described above cannot inpaint occluded areas if they are never visible in the video. To solve this problem, fusion inpainting may be utilized, which makes use of multiple video clips to inpaint a target region. Compared to state-of-the-art inpainting approaches, embodiments of the disclosure described herein are able to preserve better details in the missing region with correct perspective distortion. Temporal coherence is implicitly enforced since the 3D map is consistent across all frames. Moreover, multiple video clips captured at different times can be inpainted by registering all frames into a common 3D point map. In one embodiment, sensor datasets captured or collected from an AD vehicle can serve as inputs to the embodiments of the disclosure described herein, though other suitable datasets can be utilized, such as datasets involving both indoor and outdoor scenarios, as long as synchronized image+depth data are utilized.

In one aspect, a computer-implemented method of video inpainting is described. The method may receive a plurality of sensor data sets comprising depth frames and image frames. For each depth frame, the method may further remove one or more objects from the depth frame thereby producing a plurality of resulting depth frames without the one or more objects. The method may further stitch the plurality of resulting depth frames into a 3D map. The method may further refine a camera pose of a first image frame having a target inpainting region. The method may further project the 3D map onto the first image frame to generate a corresponding depth map.

In one embodiment, for each target pixel within the target inpainting region of the first image frame, based on the corresponding depth map, the method may further map the target pixel within the target inpainting region of the first image frame to a candidate pixel in a second image frame included in the image frames. The method may further determine a candidate color to fill the target pixel. The method may further perform Poisson image editing on the first image frame to achieve color consistency between inside and outside of the target inpainting region of the first image frame. The method may further use video fusion inpainting to inpaint occluded areas within the target inpainting region. For each pixel in the target inpainting region of the first image frame, the method may trace the pixel into neighboring frames and replacing an original color of the pixel with an average of colors sampled from the neighboring frames.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
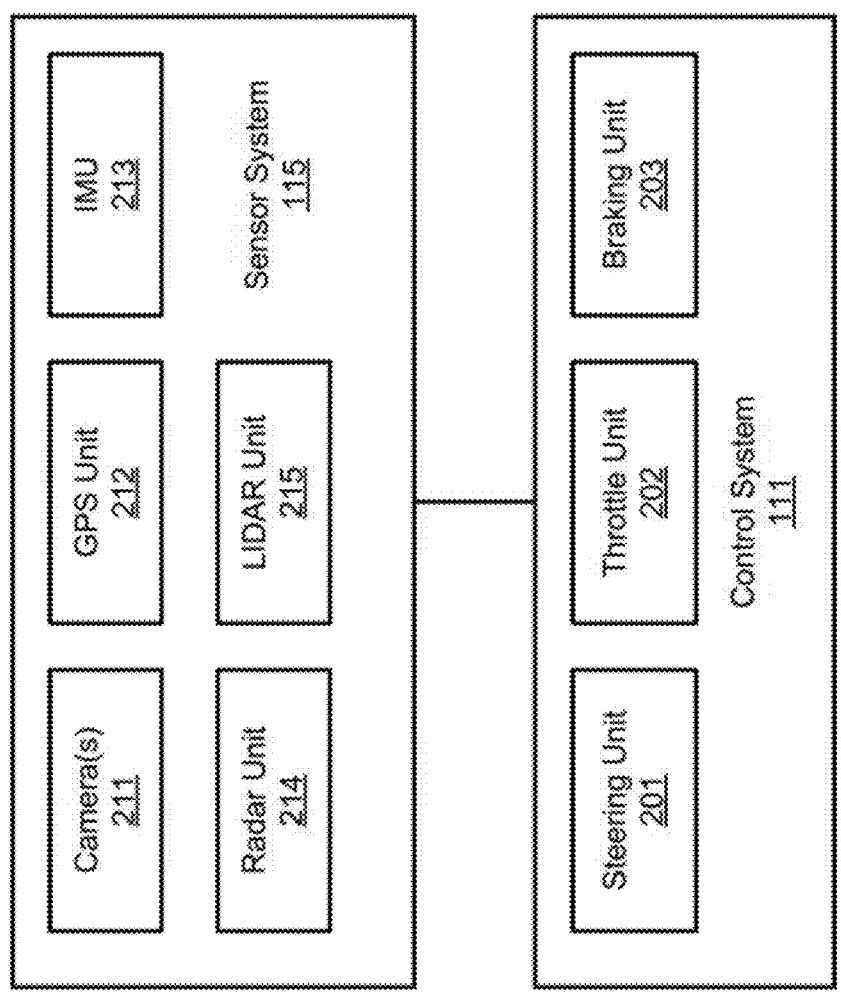
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3A:
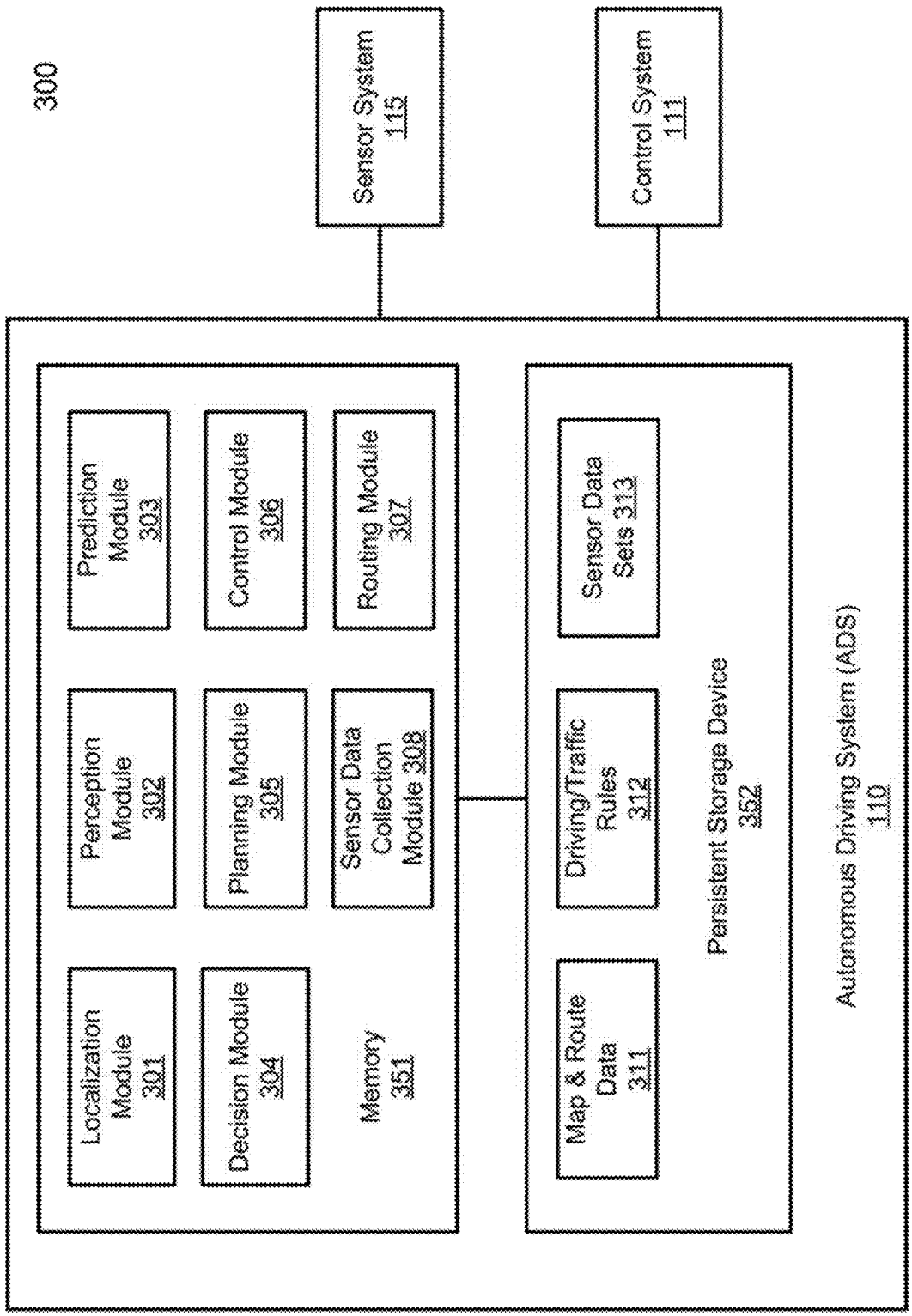
FIGS. 3A-3B are block diagrams illustrating an example of an autonomous driving system used with an autonomous driving vehicle according to one embodiment.
Figure 3B:
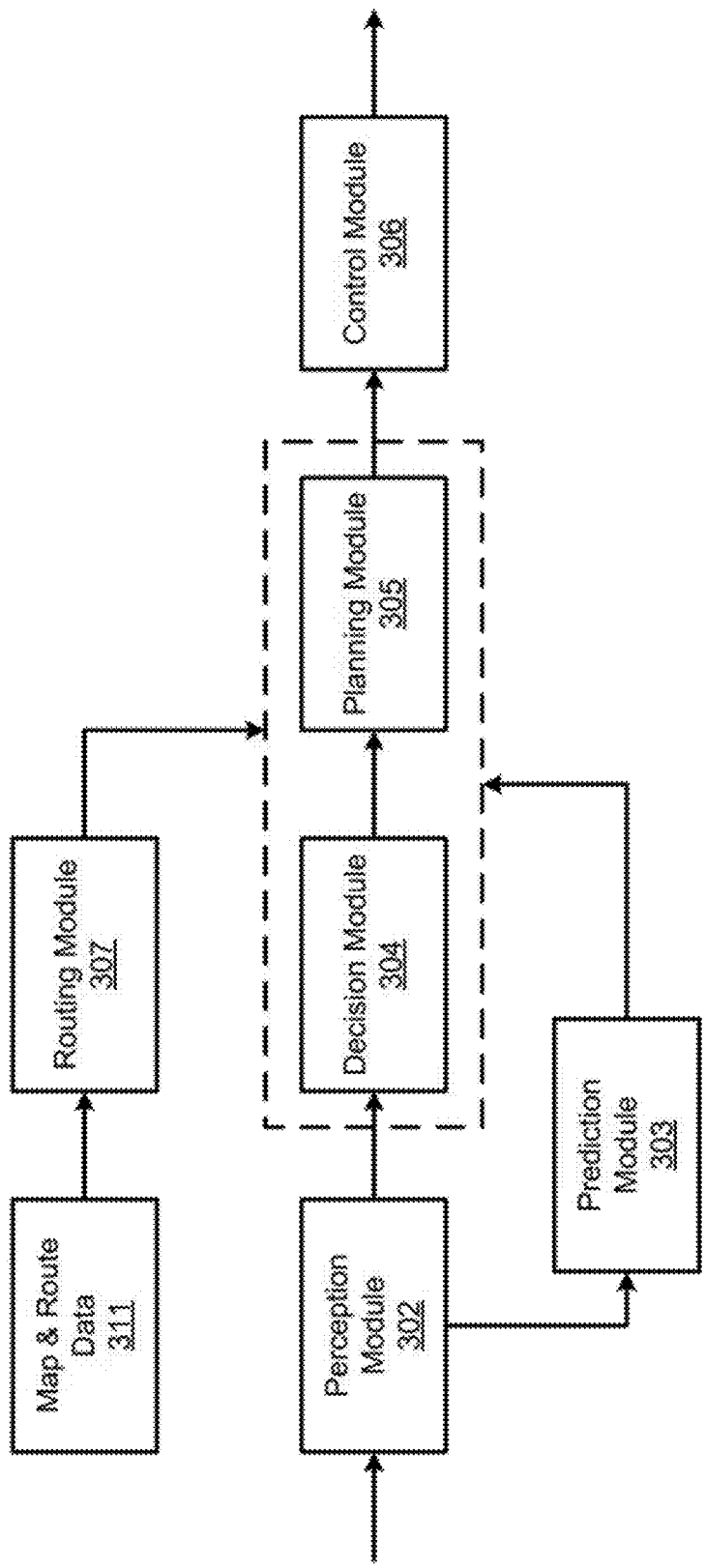

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307 and sensor data collection 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving.

The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

In one embodiment, while the ADV is moving along a route, sensor data collection module 308 may capture or collect sensor data, such as camera data, LIDAR data or frames, radar data, etc., generated from sensor system 115 (e.g., cameras 211, radar unit 214, LIDAR unit 215, etc.) and store the sensor data as part of sensor data sets 313, which may be stored in persistent storage device 352, or alternatively on a server (e.g., server 103-104), for subsequent processing. In one embodiment, sensor data sets 313 may include large-scale datasets of videos recorded over a period of time. The videos, for example, may include synchronized images, point clouds of depth images, etc. In some embodiments, data sets 313 may include challenging scenes, for example background occluded by a large vehicle (such as a bus, shuttle or truck) in an intersection, a vehicle in front blocking a front view at all time, etc. For those lengthy time occlusion scenarios, the background may be missing in the entire video sequence. Accordingly, those challenging scenarios may be captured more than once to provide data for video fusion inpainting, as described in more detail herein below.

Figure 4A:
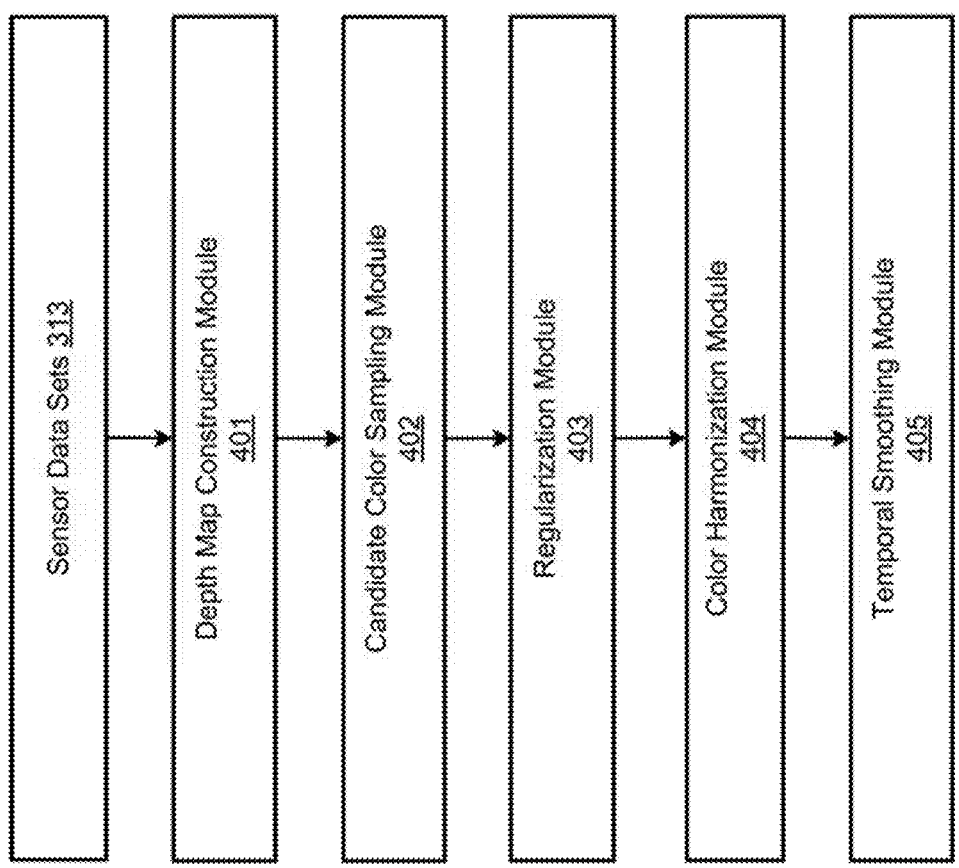
FIG. 4A is a block diagram illustrating an example video inpainting system according to one embodiment.

FIG. 4A is a block diagram illustrating an example video inpainting system according to one embodiment. Referring to FIG. 4A (and FIGS. 4B-4C), video inpainting system 400 includes a depth map construction module 401, a candidate color sampling module 402, a regularization module 403, a color harmonization module 404, and a temporal smoothing module 405. In one embodiment, depth map construction module 401 receives (or retrieves) the sensor data sets 313, for example from persistent storage device 352 or a server (e.g., server 103-104). Sensor data sets 313 may include depth frames 510 (e.g., LIDAR frames), where each depth image includes frame-wise point clouds representing one or more objects and a background of a scene. Sensor data sets 313 may also include image frames 560 captured, for example, from cameras 211 of system 115.

Figure 4B:
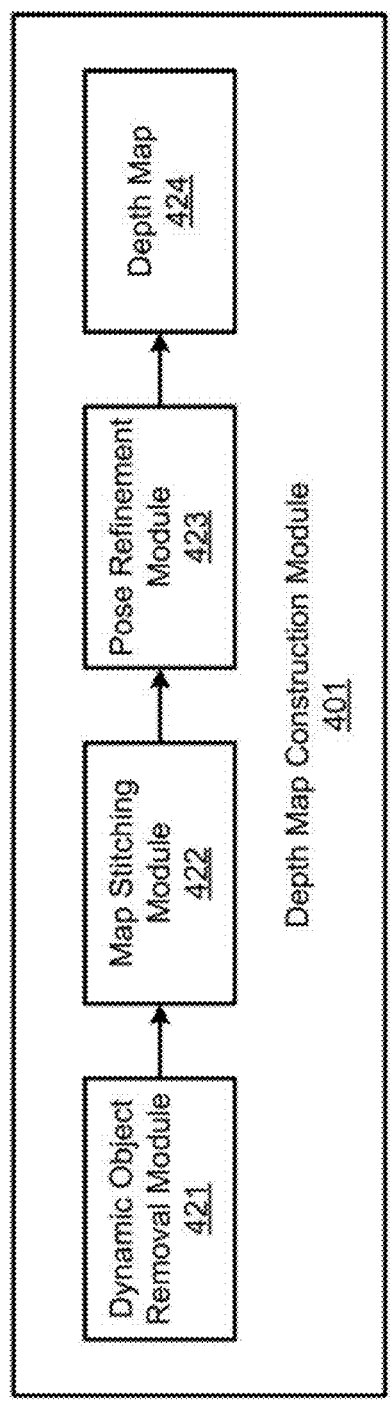
FIG. 4B is a block diagram illustrating example modules included in a depth map construction module according to one embodiment.
Figure 4C:
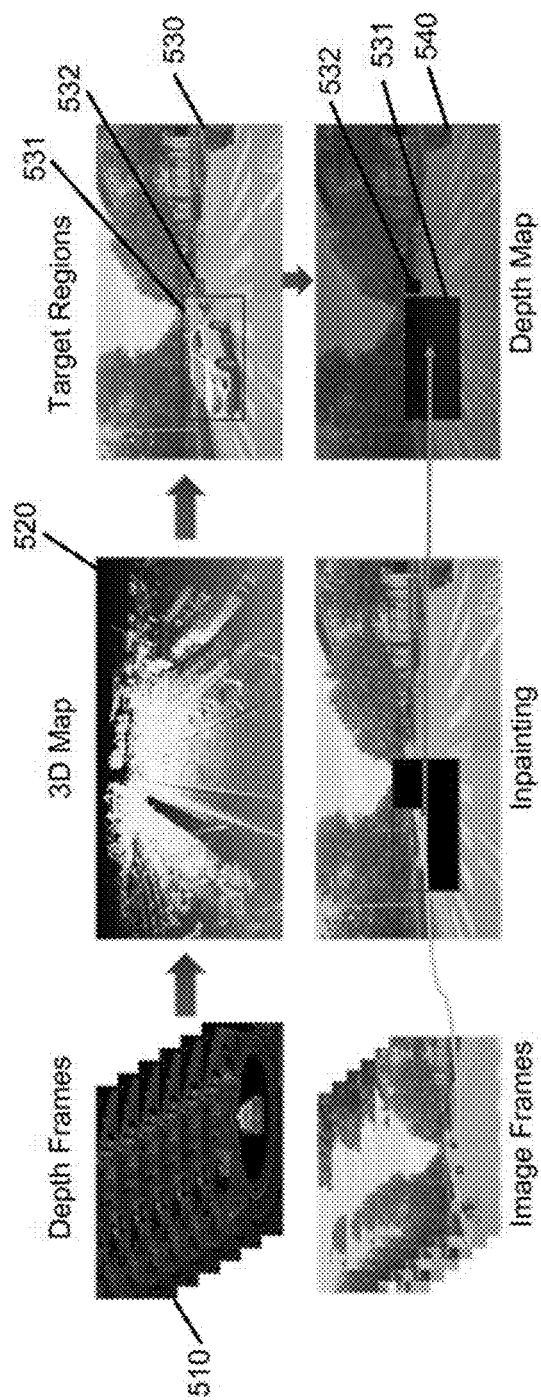
FIG. 4C is a diagram illustrating an example pipeline of a video inpainting system according to one embodiment.

As shown in FIG. 4B, depth map construction module 401 may include a dynamic object removal module 421, a map stitching module 422, and a pose refinement module 423. For each depth frame of the depth frames 510, dynamic object removal module 421 may remove moving objects from the point clouds and only maintain background points in a final 3D map. This can be relatively straight-forward to perform once the calibration between a depth sensor (e.g., LIDAR unit 215) and an image sensor (e.g., cameras 211) is performed. For example, to remove each moving object, all points that are projected in one or more bounding boxes (or target regions) of an image surrounding their respective objects (e.g., bounding boxes 531-532 of image 530) can be removed. The bounding boxes can be automatically detected or manually labeled. Alternatively, machine learning on point clouds (e.g., PointNet++) may be utilized to detect and remove those moving objects directly from the point clouds.

Using the resulting point clouds of depth frames 510, with the moving objects being removed, map stitching module 422 may stitch those resulting point clouds in a 3D map 520. For example, in one embodiment, module 422 may invoke an odometry and mapping method or tool in real-time, such as a LIDAR odometry and mapping (LOAM) method, to fuse the resulting depth frames to build 3D map 520. In another embodiment, a real-time 3D reconstruction and interaction method can be used to reconstruct 3D map 520 based on the resulting depth frames. This method can be further down-sampled to generate final point clouds with a reasonable resolution.

In one embodiment, pose refinement module 423 is configured to refine a camera pose of each image (e.g., image 530). For example, relative poses between a depth sensor and an image sensor can be calibrated in advance. However, there are still some misalignments between the point clouds and image pixels. Vibrations, inaccurate synchronization, and/or accumulative errors from point cloud stitching can cause pose offset between the image sensor and depth sensor. As an example, referring to FIG. 4D, the point cloud is projected into a target region 610 with colors. The left image shows projection by calibration result. Obviously misalignment can be seen at the boundaries. The right image shows projection by optimized rotation R, where points match more effectively with surrounding pixels. The region between target region 620 and target region 630 is where the colors of projected 3D points (e.g., point cloud in 3D map 520) are compared to image pixels (e.g., pixels in image 530) to optimize camera rotation matrix R.

Figure 4D:
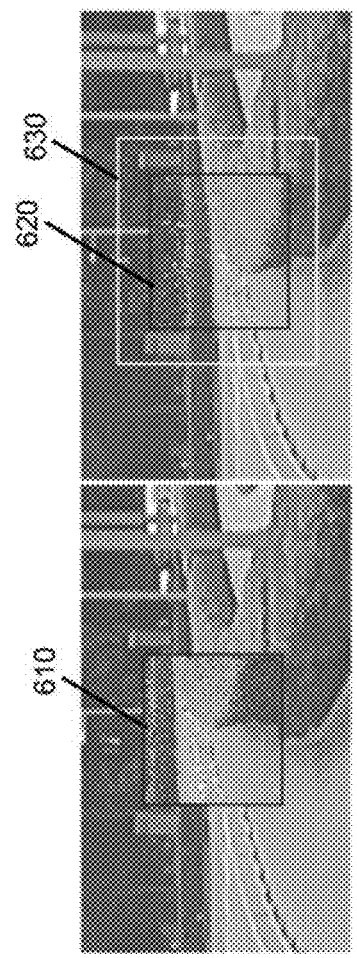
FIG. 4D is a diagram illustrating examples of point cloud projection and image pixels within a target region according to one embodiment.

In order to produce seamless inpainting results, such offset should be compensated even if it is minor. From the initial extrinsic calibration between the image sensor and depth sensor, their relative rotation R and translation T are optimized by minimizing the photometric projection error. The error is defined as:

$$E = \Sigma_{p \in \Omega} |c(p) - c(q)|^2,$$

where p is a pixel projection from the 3D map, $\Omega$ is an area surrounding the target inpainting region, which is illustrated in FIG. 4D as the region between target regions 620 and 630, and q is original pixel in the image overlaid by p. The function c returns the value of a pixel.

Note that the colors and locations of a pixel are discrete values, thereby making the error function E non-continuous on R and T. The equation above cannot be solved directly using standard solvers, such as Levenberg-Marquardt algorithm or Gauss-Newton algorithm. Instead, discrete spaces of R and T are searched to minimize E. However, R and T may have six degrees of freedom (DoF) in total, thereby making the searching space extremely large. Accordingly, T can be fixed and only R is optimized because R is dominant at determining projection location when the majority of the 3D map are distant points. Moreover, in some embodiments, only projection pixels need to be moved slightly in vertical and horizontal directions in the image space, which is determined by pitch and yaw angles of a camera (e.g., camera(s) 211 of FIG. 2). Finally, the search space may be reduced to 2 DoF, which significantly speeds up the optimization process.

Referring back to FIGS. 4B-4C, once the camera pose refined by module 423, the 3D map 520 is projected onto each image frame (e.g., image 530) to generate a corresponding depth map 540. Note that some point clouds are captured far from the current image, which can be occluded and de-occluded during the projection process. Hence, a z-buffer may be employed to obtain the nearest depth.

Figure 5:
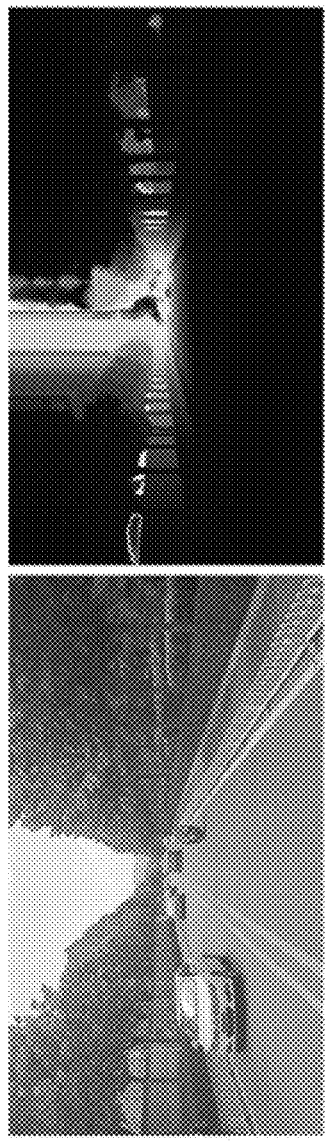
FIG. 5 is a diagram illustrating an example image and its corresponding dense depth map according to one embodiment.

To obtain a fully dense depth map, a depth estimation method can be employed to learn and produce dense depth maps from sparse ones, though a linear interpolation may be sufficient to generate a dense 3D map. In some embodiments, a median filter may be applied to remove some individual noise points, and a final example dense depth map is shown in FIG. 5. In FIG. 5, an image and its corresponding dense depth map are shown. Note that the depth is only rendered for background points and all moving objects have been removed.

With continued reference to FIG. 4A, in one embodiment, candidate color sampling module 402 is configured to map a pixel from one image to pixels from other images. As every pixel is assigned a depth value, it is possible to map a pixel from one image to other images. There are multiple choices of colors to fill in the pixels of a target inpainting region, and a guideline should be followed to find the best candidate color. For example, there are two principles to choose the best color candidate: 1) choose from the frame that is closer to the current frame temporally and 2) choose from the frame where the 3D background is closer to the camera. The first requirement ensures the video inpainting approach described herein suffers less from perspective distortion and occlusion. The second requirement is because image records more texture details when they are closer to objects, more details can be retained in the inpainting regions.

Figure 6:
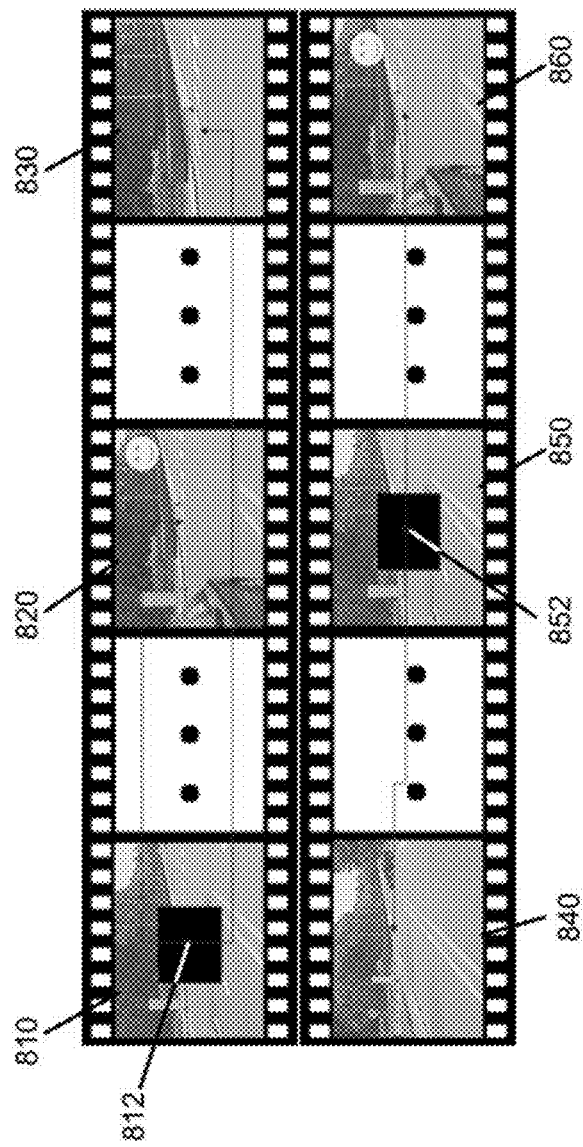
FIG. 6 is a diagram illustrating an example color candidate selection criteria according to one embodiment.

Under this guideline and the fact that sensors only move forwards during capture, module 402 is configure to first search forward temporally to the end of video and then backward until the beginning. The first valid pixel is chosen as a candidate pixel, and the valid pixel means its location does not fall into target inpainting regions. Referring now to FIG. 6, which illustrates an example of a candidate selection criteria according to one embodiment, in the top row, a pixel 812 of frame 810 may find its candidate colors in two subsequent frames 820 and 830, where road texture appears clearly in both frames 820 and 830. In this case, the frame that is temporally close to the current frame (e.g., frame 810) is chosen in order to minimize the impact of perspective change and potential occlusion or de-occlusion. In the bottom row, a pixel 852 of frame 850 may find its candidate colors in a previous frame 840 and a subsequent frame 860. In this case, the subsequent frame 860 is chosen over the previous frame 840, since the road texture is lost in frame 840.

Figure 7:
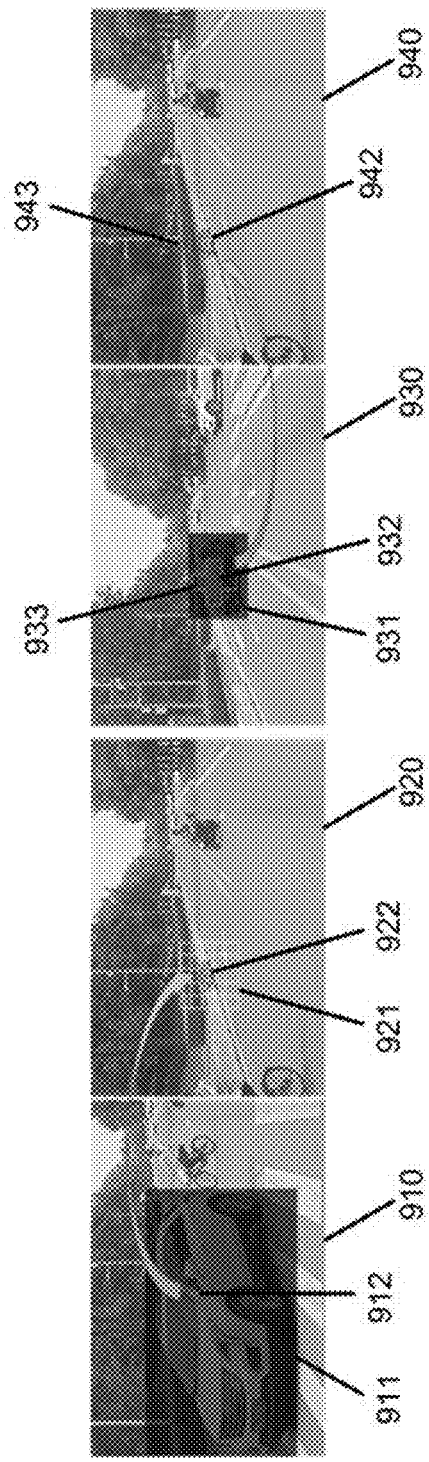
FIG. 7 is a diagram illustrating an example of another color candidate selection criteria according to one embodiment.

At this point, every pixel gets a color value individually. If the camera pose and depth value are 100% correct, perfect inpainting results can be generated with smooth boundaries and neighbors. However, such is not the case in the real world, particularly a depth map often carries errors. Therefore, regularization module 403 is invoked to enforce smoothness constraints. In one embodiment, the color selection may be formulated as a discrete global optimization problem and solve it using, for example, belief propagation (BP). Before explaining the formulation, however, the color space and neighbors of a target pixel are first defined. Referring now to FIG. 7, as shown in the left image pair (images 910-920), a target pixel 912 in frame 910 finds its candidate pixel 922 from a source image 920. Due to depth inaccuracy, the true color may not lie exactly on the candidate pixel, but a small window 921 around. Then, all pixel colors from n by n window 921 may be collected to form a color space for the target pixel 912, where n is a positive integer.

Still referring to FIG. 7, the right image pair (images 930-940) illustrates how to find out the expected colors of neighbors. Due to perspective changes, the four neighbors 933 of a target pixel 932 are not necessarily neighbors in source image 940. Thus, neighboring pixels 943 may be warped into the source image 940 by their depth value to sample the expected colors.

In more detail, in one embodiment, let P be a set of pixels in a target inpainting region (e.g., region 911/931 of FIG. 7) and L be a set of labels. The labels correspond to indices of potential colors in the color space. A labeling function l assigns a lp∈L to each pixel p∈P. It is assumed that the labels should vary smoothly almost everywhere, but may change dramatically at some places such as object boundaries. The quality of labeling is given by an energy function as:

$$E = \sum_{(p,q)\in N} V(l_p, l_q) + \sum_{p\in P} D_p(l_p),$$

where N represents the number of edges in a four-connected image grid graph. V(lp,lq) is the cost of assigning labels lp and lq to two neighboring pixels, and may be referred to as a discontinuity cost. Dp(lp) is the cost of assigning label lp to pixel p, which may be referred to as a data cost. Determining a labeling with minimum energy corresponds to a Maximum A Posteriori (MAP) estimation problem.

Accordingly, a boundary smoothness constraint can be incorporated into the data cost as follows:

$$D_p(l_p) = \begin{cases} |C_{pl}(l_p) - I(q)|, & \text{if } p \text{ is left boundary pixel} \\ |C_{pr}(l_p) - I(q)|, & \text{if } p \text{ is right boundary pixel} \\ |C_{pt}(l_p) - I(q)|, & \text{if } p \text{ is top boundary pixel} \\ |C_{pb}(l_p) - I(q)|, & \text{if } p \text{ is bottom boundary pixel} \\ \alpha, & \text{otherwise} \end{cases}$$

where Cpl, Cpr, Cpt, Cpb return expected colors of pixel p's left, right, top and bottom neighbors respectively. q is the neighbor pixel of p outside of the inpainting region in the target image, thus it has known color, which is returned by the function I(q). In one embodiment, difference of true neighbor color and expected neighbor color is taken as a measure of labeling quality. For pixels not on the inpainting boundary, equal opportunities are given to all the labels by assigning a constant value of α. The discontinuity cost is defined as:

$$V(l_p, l_q) = \begin{cases} |C_{pl}(l_p) - C_q(l_q)| + |C_p(l_p) - C_{qr}(l_q)| & \text{if } L \\ |C_{pr}(l_p) - C_q(l_q)| + |C_p(l_p) - C_{ql}(l_q)| & \text{if } R \\ |C_{pt}(l_p) - C_q(l_q)| + |C_p(l_p) - C_{qb}(l_q)| & \text{if } T \\ |C_{pb}(l_p) - C_q(l_q)| + |C_p(l_p) - C_{qt}(l_q)| & \text{if } B \end{cases}$$

Here, $C_p(\cdot)$ and $C_q(\cdot)$ fetch colors for p and q at label $l_p$ and $l_q$. L, R, T, B stand for q is on the left, on the right, on the top and on the bottom, respectively. For a pair of two neighboring pixels p and q, the differences between p's color and q's expected color of p can be computed, and vice versa.

Figure 8:
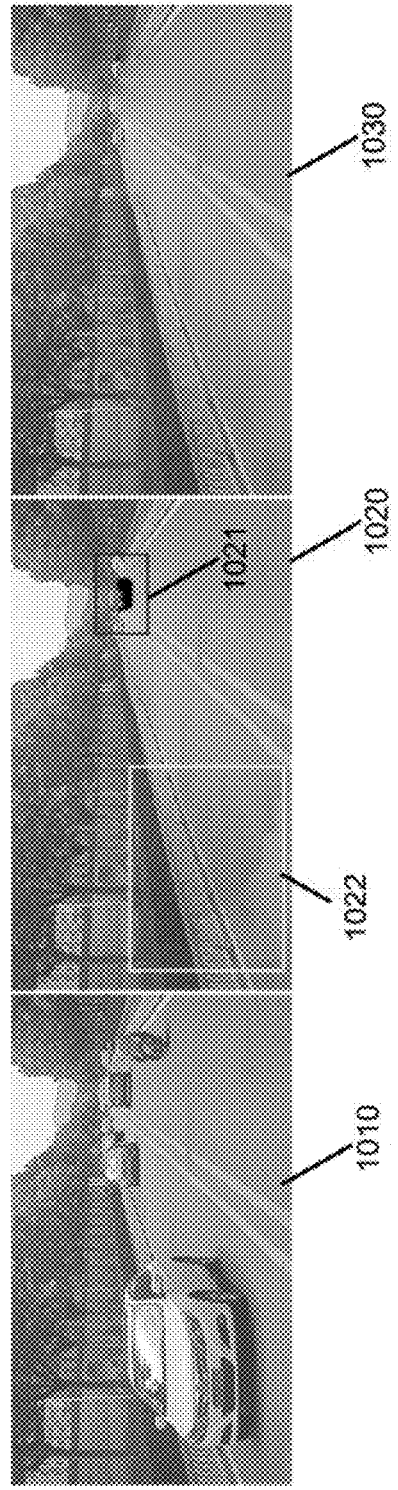
FIG. 8 is a diagram illustrating example color harmonization results according to one embodiment.

In one embodiment, color harmonization module 404 is configured to use Poisson image editing to generate smooth and seamless blending boundaries. As an example, pixels from different frames may have different colors due to changing camera exposure time and white balance, thereby causing color discontinuities (as can be seen in FIG. 8). These problems may be solved using Poisson image editing. Poisson image editing is originally proposed to clone an image patch from source image into a destination image with seamless boundary and original texture. It achieves this by solving the following minimization problem:

$$\min_f \iint_\Omega |\Delta f - v| \text{ with } f|_{\partial\Omega} = f^*|_{\partial\Omega}.$$

Ω is the inpainting region with boundary ∂Ω. f* is a color function of a destination image and f is the color function of the target inpainting region within the destination image. Δ.=[∂./∂x, ∂./∂y] is a gradient operator. v is the desired color gradient defined over Ω.

Here, v is computed using the output from the belief propagation step, with one exception. If two neighboring pixels within Ω are from different frames, their gradient may be set to 0. This allows color consistency within the inpainting regions. The effectiveness of this solution is demonstrated in FIG. 8. In FIG. 8, left image 1010 is an input image. Middle image 1020 is an inpainting result. Note the color discontinuity in region 1022 and the blank pixels in region 1021. Note that blank-pixel region 1021 is also filled up. Since blank pixels have 0 gradient values, solving the Poisson equation on this part is equivalent to smooth color interpolation. Lastly, the right image 1030 is the result after color harmonization.

Herein, it is assumed that the inpainting regions are visible in some other frames. Otherwise, some pixels would remain blank, as can be seen from FIG. 8 in region 1021. Learning-based methods can hallucinate inpainting colors from their training data. In contrast, embodiments of the disclosure described herein cannot inpaint occluded areas if they are never visible in the video, thereby leaving blank pixels.

For small areas of blank pixels, a smooth interpolation is sufficient to fill the holes. However, in some embodiments, a vehicle in front, for example, can block a wide field of view for the entire video duration, thereby leaving large blank holes. A simple interpolation is not capable of handling this problem. This problem can be addressed by capturing another video of the same scene, where the occluded parts become visible. Fortunately, newly captured frames can be registered into an existing 3D map using a LOAM method. Once new frames are registered and merged into the existing 3D map, inpainting is performed exactly the same way.

With continued reference to FIG. 4A, temporal smoothing module 405 may compute forward and backward optical flows for all result frames. That is, for every pixel in the target inpainting areas, module 405 may trace the pixel into neighboring frames using the optical flow and replace the original color of the pixel with an average of colors sampled from neighboring frames.

Figure 9:
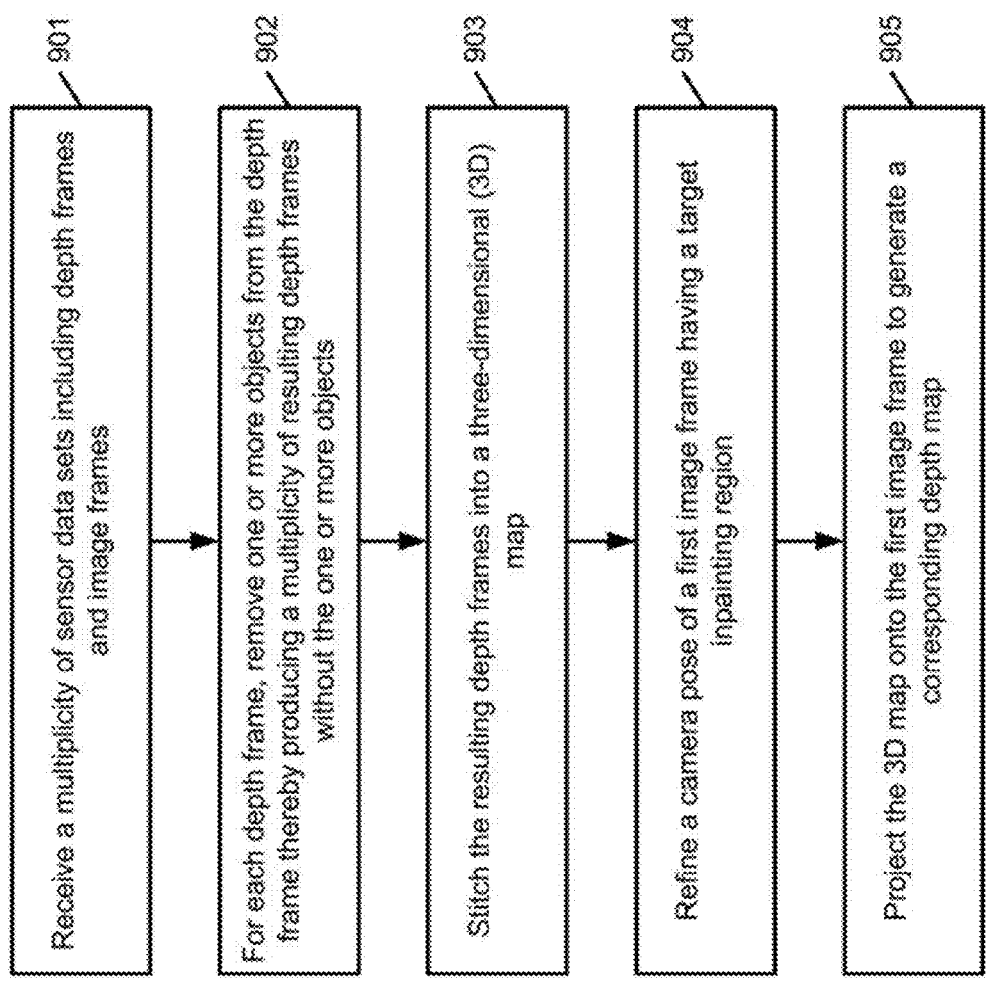
FIG. 9 is a flow diagram illustrating an example method of constructing a depth map according to one embodiment.

FIG. 9 is a flow diagram illustrating an example method of constructing a depth map according to one embodiment. Method 900 may be performed by hardware, software, or a combination of both. For example, method 900 may be performed by depth map construction module 401 of FIG. 4B.

Referring the FIG. 9, at block 901, the method receives a multiplicity of sensor data sets including depth frames and image frames. At block 902, for each depth frame, the method removes one or more objects from the depth frame thereby producing a multiplicity of resulting depth frames without the one or more objects. At block 903, the method stitches the resulting depth frames into a 3D map. At block 904, the method refines a camera pose of a first image frame having a target inpainting region. At block 905, the method projects the 3D map onto the first image frame to generate a corresponding depth map.

Figure 10:
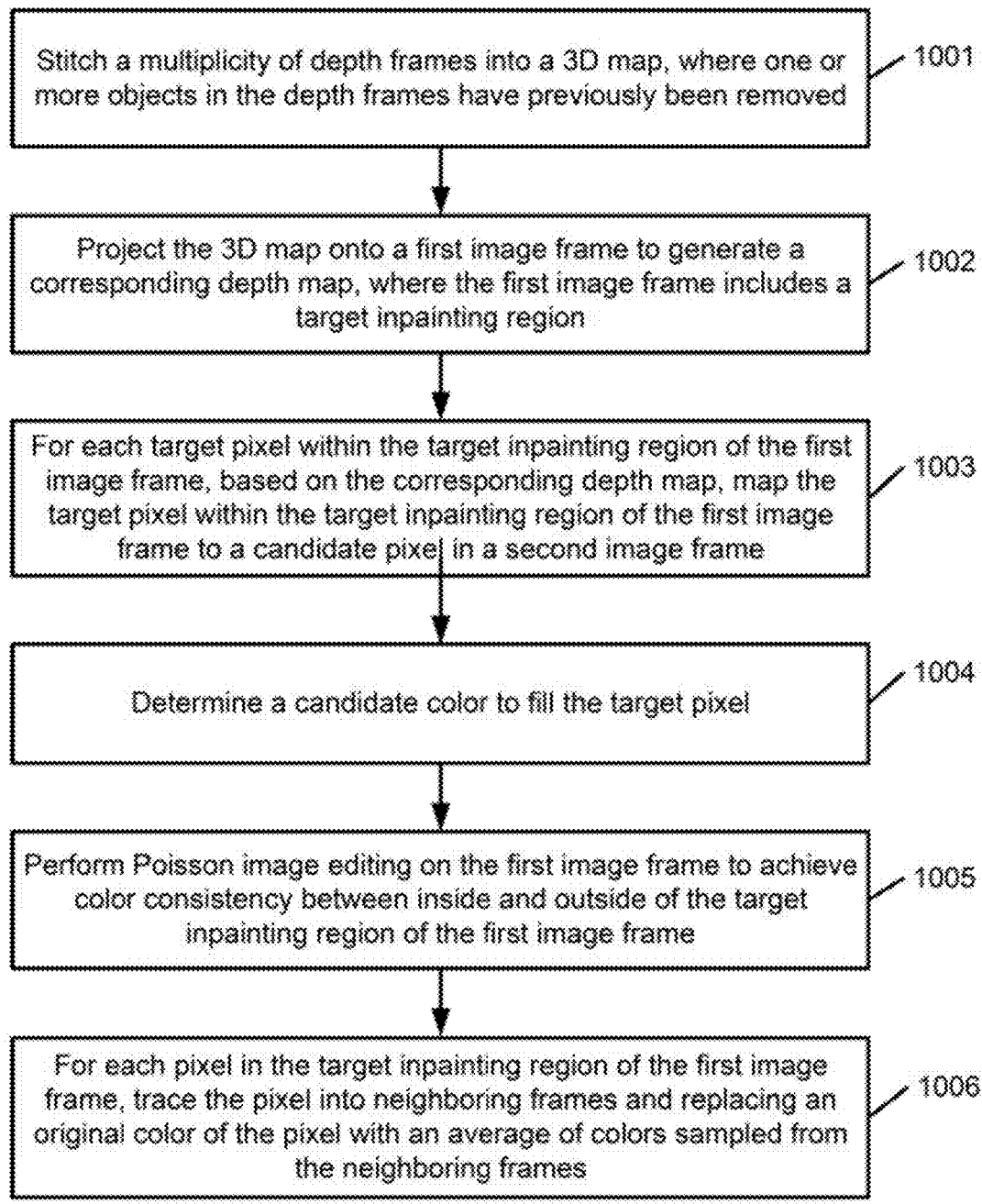
FIG. 10 is a flow diagram illustrating an example of a method of video inpainting according to one embodiment.

FIG. 10 is a flow diagram illustrating an example of a method of video inpainting according to one embodiment. Method 1000 may be performed by hardware, software, or a combination of both. For example, method 1000 may be performed by system 400 of FIG. 4A.

Referring to FIG. 10, at block 1001, the method stitches a multiplicity of depth frames into a 3D map, where one or more objects in the depth frames have previously been removed. At block 1002, the method projects the 3D map onto a first image frame to generate a corresponding depth map, where the first image frame includes a target inpainting region. At block 1003, for each target pixel within the target inpainting region of the first image frame, based on the corresponding depth map, the method maps the target pixel within the target inpainting region of the first image frame to a candidate pixel in a second image frame. At block 1004, the method determines a candidate color to fill the target pixel. At block 1005, the method performs Poisson image editing on the first image frame to achieve color consistency between inside and outside of the target inpainting region of the first image frame. At block 1006, for each pixel in the target inpainting region of the first image frame, the method traces the pixel into neighboring frames and replacing an original color of the pixel with an average of colors sampled from the neighboring frames.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A computer-implemented method of video inpainting, comprising:
   receiving a plurality of sensor data sets comprising depth frames and image frames;
   for each depth frame, removing one or more objects from the depth frame thereby producing a plurality of resulting depth frames without the one or more objects;
   stitching the plurality of resulting depth frames into a three-dimensional (3D) map;
   refining a camera pose of a first image frame having a target inpainting region;
   projecting the 3D map onto the first image frame to generate a corresponding depth map; and
   for each target pixel within the target inpainting region of the first image frame, based on the corresponding depth map, mapping the target pixel within the target inpainting region of the first image frame to a candidate pixel in a second image frame included in the image frames, and determining a candidate color to fill the target pixel;
   wherein determining the candidate color to fill the target pixel comprises warping neighboring pixels around the candidate pixel into the second image frame by depth values of the neighboring pixels to sample expected colors to fill the target pixel;
   wherein warping the neighboring pixels around the candidate pixel into the second image frame comprises:
   computing an energy function based on a set of pixels in the target inpainting region and a set of labels corresponding to indices of candidate colors in a color space, and
   incorporating boundary smoothness constraint into a data cost based on respective expected colors of the neighboring pixels.

2. The method of claim 1, further comprising performing Poisson image editing on the first image frame to achieve color consistency between inside and outside of the target inpainting region of the first image frame.

3. The method of claim 1, wherein each depth frame includes point clouds representing one or more objects and a background of a scene.

4. The method of claim 2, further comprising for each pixel in the target inpainting region of the first image frame, tracing the pixel into neighboring frames and replacing an original color of the pixel with an average of colors sampled from the neighboring frames.

5. The method of claim 1, wherein the second image frame is temporally close to the first image frame.

6. The method of claim 1, wherein the second image frame is a previous frame from the first image frame or a subsequent frame from the first image frame.

7. The method of claim 2, wherein performing Poisson image editing on the first image frame comprises calculating a minimization function as follows:

$$\min_{f} \int\int_{\Omega} |\Delta f - v| \text{ with } f|_{\partial\Omega} = f^*|_{\partial\Omega},$$

wherein $\Omega$ is the target inpainting region with boundary $\partial\Omega$, $f^*$ is a color function of the first image frame, f is a color function of the target inpainting region within the first image frame, $\Delta.=[\partial./\partial x, \partial./\partial y]$ is a gradient operator, and v is a desired color gradient defined over $\Omega$.

8. A non-transitory machine-readable medium having instructions stored therein, which when executed by a processor, cause the processor to perform operations, the operations comprising:
   receiving a plurality of sensor data sets comprising depth frames and image frames;
   for each depth frame, removing one or more objects from the depth frame thereby producing a plurality of resulting depth frames without the one or more objects;
   stitching the plurality of resulting depth frames into a three-dimensional (3D) map;
   refining a camera pose of a first image frame having a target inpainting region;
   projecting the 3D map onto the first image frame to generate a corresponding depth map; and
   for each target pixel within the target inpainting region of the first image frame, based on the corresponding depth map, mapping the target pixel within the target inpainting region of the first image frame to a candidate pixel in a second image frame included in the image frames, and determining a candidate color to fill the target pixel;
   wherein determining the candidate color to fill the target pixel comprises warping neighboring pixels around the candidate pixel into the second image frame by depth values of the neighboring pixels to sample expected colors to fill the target pixel;
   wherein warping the neighboring pixels around the candidate pixel into the second image frame comprises:
   computing an energy function based on a set of pixels in the target inpainting region and a set of labels corresponding to indices of candidate colors in a color space, and
   incorporating boundary smoothness constraint into a data cost based on respective expected colors of the neighboring pixels.

9. The non-transitory machine-readable medium of claim 8, wherein the operations further comprise performing Poisson image editing on the first image frame to achieve color consistency between inside and outside of the target inpainting region of the first image frame.

10. The non-transitory machine-readable medium of claim 8, wherein each depth frame includes point clouds representing one or more objects and a background of a scene.

11. The non-transitory machine-readable medium of claim 9, wherein the operations further comprise for each pixel in the target inpainting region of the first image frame, tracing the pixel into neighboring frames and replacing an original color of the pixel with an average of colors sampled from the neighboring frames.

12. The non-transitory machine-readable medium of claim 8, wherein the second image frame is temporally close to the first image frame.

13. The non-transitory machine-readable medium of claim 8, wherein the second image frame is a previous frame from the first image frame or a subsequent frame from the first image frame.

14. The non-transitory machine-readable medium of claim 9, wherein performing Poisson image editing on the first image frame comprises calculating a minimization function as follows:

$$\min_{f} \int\int_{\Omega} |\Delta f - v| \text{ with } f|_{\partial\Omega} = f^*|_{\partial\Omega},$$

wherein $\Omega$ is the target inpainting region with boundary $\partial\Omega$, $f^*$ is a color function of the first image frame, f is a color function of the target inpainting region within the first image frame, $\Delta.=[\partial./\partial x, \partial./\partial y]$ is a gradient operator, and v is a desired color gradient defined over $\Omega$.

15. A data processing system, comprising:
a processor; and
a memory coupled to the processor to store instructions, which when executed by the processor, cause the processor to perform operations, the operations including receiving a plurality of sensor data sets comprising depth frames and image frames;

for each depth frame, removing one or more objects from the depth frame thereby producing a plurality of resulting depth frames without the one or more objects;

stitching the plurality of resulting depth frames into a three-dimensional (3D) map;

refining a camera pose of a first image frame having a target inpainting region;

projecting the 3D map onto the first image frame to generate a corresponding depth map; and for each target pixel within the target inpainting region of the first image frame, based on the corresponding depth map, mapping the target pixel within the target inpainting region of the first image frame to a candidate pixel in a second image frame included in the image frames, and determining a candidate color to fill the target pixel;

wherein determining the candidate color to fill the target pixel comprises warping neighboring pixels around the candidate pixel into the second image frame by depth values of the neighboring pixels to sample expected colors to fill the target pixel;

wherein warping the neighboring pixels around the candidate pixel into the second image frame comprises:

computing an energy function based on a set of pixels in the target inpainting region and a set of labels corresponding to indices of candidate colors in a color space, and incorporating boundary smoothness constraint into a data cost based on respective expected colors of the neighboring pixels.

\* \* \* \* \*